E. B. SYMONS.
SCREEN.
APPLICATION FILED AUG. 20, 1915.

1,222,903.

Patented Apr. 17, 1917.
2 SHEETS—SHEET 2.

Witnesses.
Edward T. Wray.
Christina Dears.

Inventor.
Edgar B. Symons.
by Parker & Carty
Attorneys.

UNITED STATES PATENT OFFICE.

EDGAR B. SYMONS, OF WINNETKA, ILLINOIS.

SCREEN.

1,222,903.

Specification of Letters Patent.   Patented Apr. 17, 1917.

Application filed August 20, 1915.   Serial No. 46,546.

*To all whom it may concern:*

Be it known that I, EDGAR B. SYMONS, a citizen of the United States, residing at Winnetka, in the county of Cook and State of Illinois, have invented a certain new and useful Improvement in Screens, of which the following is a specification.

My invention relates to improvements in screens and screen devices for separating and classifying materials and the like, and has for one object to provide a separating screen which would be of large capacity, and which will be free from the clogging and undue wearing so common in the case of an ordinary screen. Another object of my device is to provide a compact screen and screening device which would take up a minimum of room. Other objects of my invention will appear in the specification.

The invention is illustrated more or less diagrammatically in the accompanying drawings, wherein—

Like parts are indicated by similar letters throughout all the figures.

A is a cylindrical housing having a cover $A^1$ through which discharges the supply funnel and chute $A^2$. This cylindrical housing is surrounded by a triangular housing $A^3$ lower than the cylindrical housing, but resting upon the same base $A^4$, being supported thereon by means of a flange $A^5$ somewhat similar to the flange $A^6$ which supports the cylindrical housing. This base may rest upon any suitable skids such as those shown at $A^7$.

$B, B^1$ are two concentric cylindrical screens. The screen B is supported and stiffened at its upper end by a flange $B^2$, upon which rests a closing plate $B^3$, which effectually closes the upper end of the cylinder formed by the screen. The lower end of the screen B is supported on an annular ring $B^4$ in which is mounted an inverted truncated conical plate or chute $B^5$, whose open discharge center is located above the hopper $B^6$ which hopper discharges out of the machine through a passage $B^7$. The screen $B^1$ has at its upper end an annular collar $B^8$ concentric with the ring $B^2$, and at the lower end an annular ring $B^9$ concentric with the ring $B^4$. This ring $B^9$ carries a truncated conical annular apron $B^{10}$ which overlies the outer wall $B^{11}$ of the annular hopper chamber $B^{12}$, which hopper chamber surrounds the chamber $B^6$ and separately discharges through the passage $B^{13}$. The housing which contains and forms the hoppers $B^6$, $B^{12}$, is supported by means of the arms $B^{23}$ from the base $A^4$, apertures being provided in that base between the arms to permit a free discharge of the material from the interior of the housing A outside the screen $B^1$.

Arranged about the outer periphery of the screen $B^1$ are the three vertically disposed stiffening and supporting ribs C. These ribs are rigidly bolted to the rings $B^8$, $B^9$ and are also connected rigidly to stiffening ribs $C^1$ inside the screen B, spacing plugs $C^2$ being interposed between the screens so that the holding bolts may tie the whole together. Further spacing blocks $C^3$ between the screens adjacent the centers of the vertical ribs are also used, so that the bolts there may tie the two ribs, the blocks, and the two screens together to form a rigid cylindrical double walled screen. $C^5$ is an annular ring. It has three radially disposed arms $C^6$ passing in through apertures $C^7$ in the housing A to support the three ribs C. This annular ring supports guides and drives on the screening cylinders, and is provided with three radially disposed outwardly extending arms $C^8$ midway between the arms $C^6$. Each one of these arms terminates in a sleeve $C^9$ braced by a diagonal web $C^{10}$ and each sleeve contains a downwardly extending pin $C^{11}$ rigidly held therein.

Figure 1:
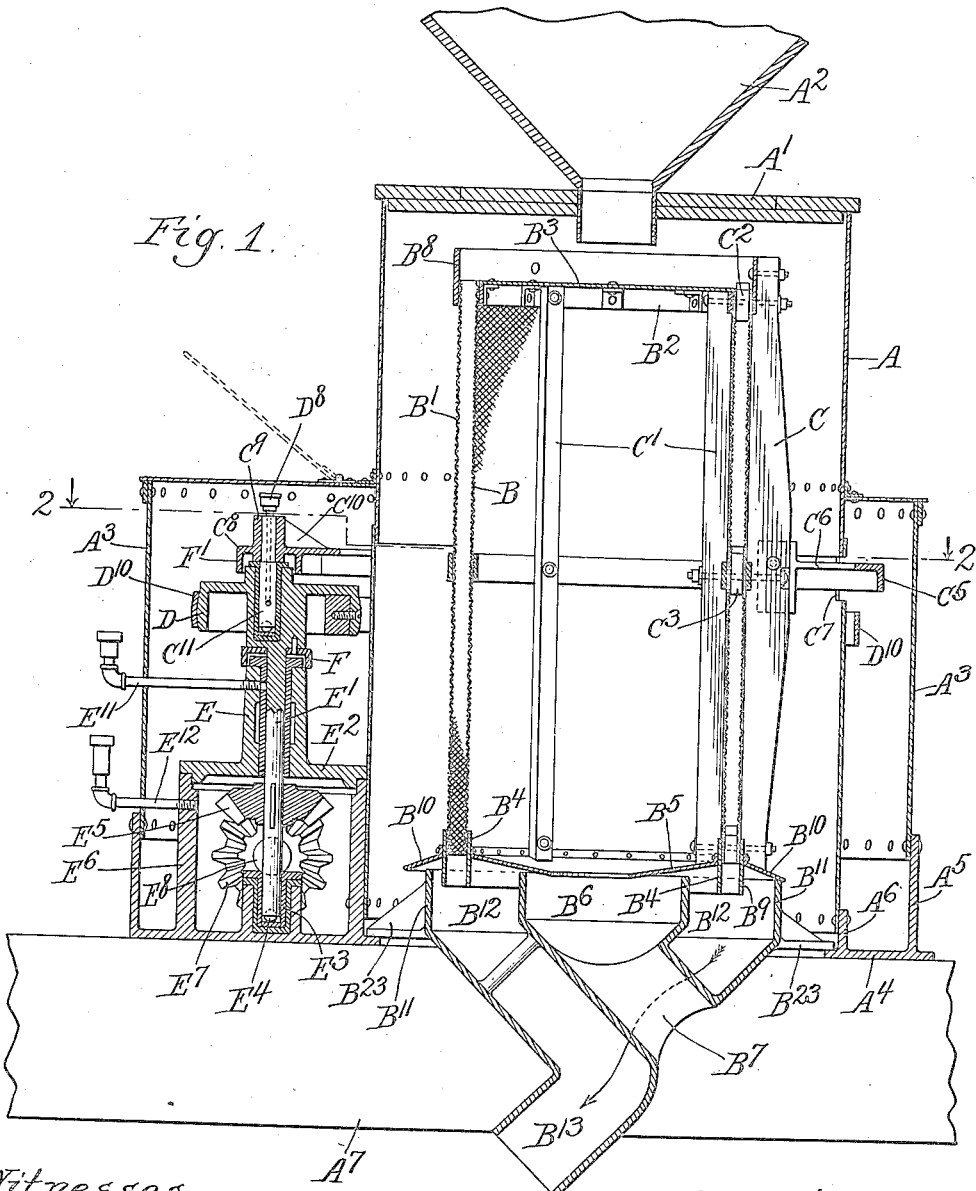
Figure 1 is a vertical screen through the device.
Figure 2:
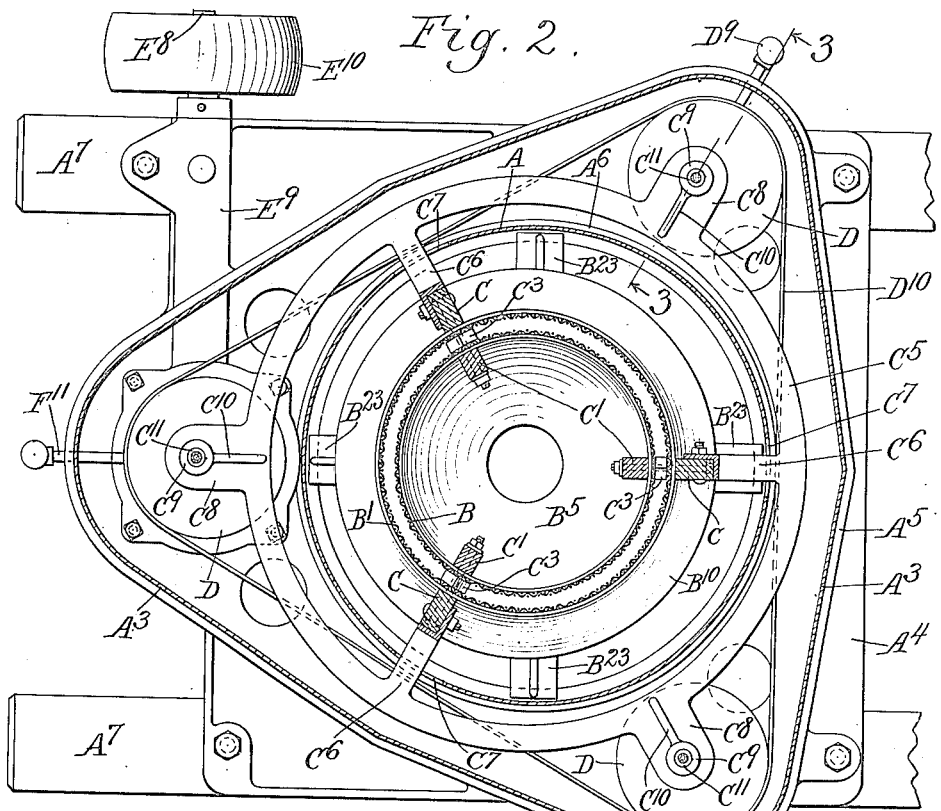
Fig. 2 is a section along the line 2—2 of Fig. 1.
Figure 3:
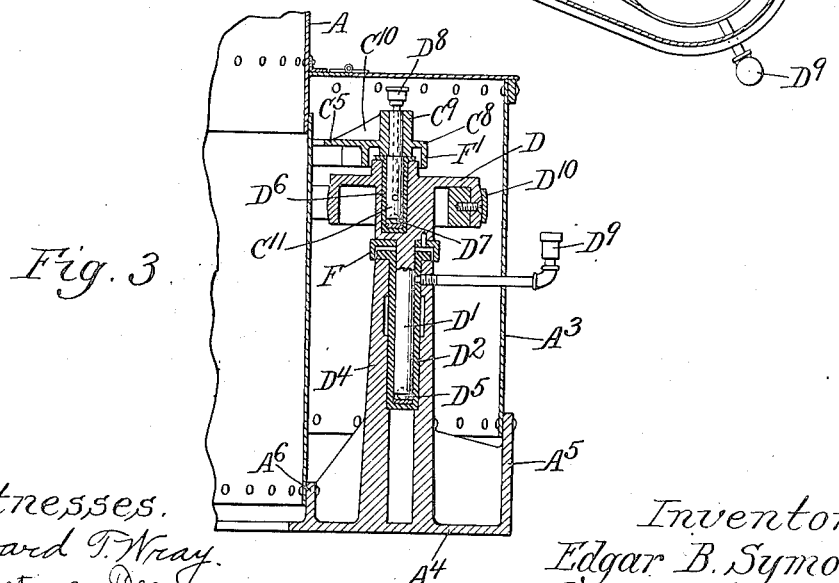
Fig. 3 is a section along the line 3—3 of Fig. 2.

D is a pulley mounted on a shaft $D^1$ and a bearing sleeve $D^2$ in a bracket $D^4$ on the base $A^4$. At its lower end is a thrust ball bearing $D^5$. $D^6$ is a sleeve eccentrically mounted in the pulley D, and this sleeve forms the bearing for the pin $C^{11}$, which pin is provided at its lower end with a ball thrust bearing $D^7$; the bearing in the sleeve $D^6$ being lubricated by a grease cup $D^8$, the bearing in the sleeve $D^2$ by a grease cup $D^9$. $D^{10}$ is a belt riding over all three of these pulleys. It will be understood that the assembly of two of the pulleys and supports is indicated and described as shown in Fig. 3. The one driving pulley, however, is different in that the support E is substituted for the support D⁴, and that the shaft E¹ is substituted for the shaft D¹. This shaft E¹ extends down below the support E, which support in turn is mounted on a plate E² into a sleeve E³, which projects up from the base A⁴. At the bottom of this sleeve is a similar thrust bearing E⁴. Keyed to the shaft E¹ is a miter gear E⁵ inside the housing E⁶ which is closed at its top by the plate E². In mesh with this gear is a gear E⁷ on the drive shaft E⁸, and the drive shaft E⁸ which is rotatably mounted on a bearing E⁹ carries a driving pulley E¹⁰, whereby the machinery may be operated by the application of power from any suitable source. This driving shaft and associated parts together with the gears, are lubricated by oil or grease inserted or withdrawn as the case may be through the pipes E¹¹, E¹². It will be noted that each of the bearings is closed or guarded by an annular flanged ring F, mounted on the lower side of the hub carrying the pulley, and that the annular ring C⁵ is flanged, and this flange forms at eccentric pin points a guard apron F¹ to guard and protect the upper ends of the bearings, the purpose of this being, of course, to minimize, to as great an extent as possible, the introduction of foreign matter, dirt, dust, and the like in the bearings.

It will be evident that while I have shown in my drawings an operative device, still many changes might be made in size, shape, and arrangement of parts, without departing from the spirit of my invention.

The use and operation of my invention are as follows:—

The material which is to be screened, is fed into the hopper. From it it passes down on to the plate at the top of the screening cylinders, the driving shaft being meanwhile rotated at a high rate of speed, it drives the driving pulley, the rotation of that pulley drives the belt on the other two pulleys and causes them to rotate. Since the three pulleys are arranged at the apexes of a quinquangular triangle, and since the three eccentric pins are also arranged at the apexes of a quinquangular triangle, and since each of these pins is eccentrically mounted in the pulley, it will be obvious that any rotation of any one of the three pulleys will cause, whether with or without the belt, a rotation of each of the other two, meanwhile causing a gyration of the connecting ring, and any objects such as the screen, carried by it. The belt is useful in that it insures a rotation of all the parts without binding or undue resistance, but experience shows that the device can be operated without the belt, since the eccentric rotation of one member of the triangular system causes both the others to rotate. However, the important thing is that this rotation causes a rapid oscillation of the two concentric screening cylinders as they oscillate the material, which is discharged centrally upon the baffle plate or floor at the top of the cylinder, is fed out radially in a more or less continuous and regular film until it passes over the upper edge of the inner screen, and drops down into the annular chamber between the two screens. There it proceeds to fall freely along vertical lines under the influence of gravity. This fall continues, being only momentarily interrupted by the violent contact of the material with the screening surface until the material has fallen out of the machine. It will be understood that the material itself tends to fall under the influence of gravity along vertical lines in a substantially angular or cylindrical film. The two screens are the same size. A particle which will pass through one, will pass through the other. The machine is designed to divide or separate the product into two classes, one made up of particles fine enough to pass through the screen, the other class made up of particles too coarse to pass through the screen. As the screen cylinders gyrate back and forth, they strike first on one side and then on the other, the moving column of material. This material being at rest with respect to the movement of the screens is struck violently by them. The result of this movement of the screen is to propel the material first in one direction and then in another, the coarser particles which cannot pass through the screen being always compelled to follow the movement of the screen. The finer particles can fly out to one side or the other. Once out they are no longer attacked by the screen, but are able to fall freely down outside or inside of the screen cylinders. Undoubtedly some material which has left the screen will be caught and returned to it upon its return stroke, but before the column has had time to pass down the full length of the screen, all such material will have been separated out so that at the bottom of the screen nothing but the coarse particles will be found in the central annular column, whereas nothing but fine particles will be found on the outer or in the inner sheet or film of moving material. These two groups are handled and discharged from the bottom of the screen through the series of funnels and passages, as indicated, in the usual manner, and the product is of course disposed of in any suitable way.

It will be understood that since the screen is vertically disposed, and since the material moves along the screen parallel with it under the influence of gravity, the material is never supported by the screen, the column of material, owing to its free fall through the air, is never compact, it is always loose, and there is never any fixed or even remotely continuous blanket of material adhering to or overlying the screen. The only time when the material comes into effective contact with the screen is when it is violently hit by it. This may instantaneously tend to compact the column of material against the screen, but a large part of this column is by the impact, forced through the screen and out on the other side, and before the material has had time to compact, the screen has left it. Thus there can be no clogging of the screen machine, and experience shows that the screen is at all times substantially free from any material other than the material actually passing through it for the purpose of separation. That is to say, any particle small enough to pass through the screen goes through it, any particle too large to pass through the screen falls along it, and does not rest upon it or catch in it.

Every movement of the screen either in or out, results in separating the material, and the material, instead of being forced through the screen by the force of gravity, is driven violently through it by the impact of the screen against it. The result is that the material passes through the screen at a very high rate of speed, and is projected out on either side at an appreciable distance. Thus there is a positive separation, and this separation takes place very rapidly, and experience shows that a very thick film of material may be handled through the screen without the slightest danger of clogging, even though the material be moist and sticky.

I claim:

1. The combination with a vertically disposed cylindrical screen, of means for feeding material along the surface thereof, and means for vibrating the screen against the moving material.

2. The combination with a vertically disposed cylindrical screen of means for feeding material vertically along the surface thereof, and means for vibrating the screen against the moving material.

3. The combination with a vertically disposed cylindrical screen, of means for feeding material along the surface thereof, and means for intermittently bringing the screen surface into violent contact with the material.

4. The combination with a vertically disposed cylindrical screen, of means for feeding material vertically along the surface thereof, and means for intermittently bringing the screen surface into violent contact with the material.

5. The combination with a plurality of parallel screens arranged in juxtaposition, of means for feeding a thin film of material between them, and means for vibrating the screens against the material.

6. The combination with a plurality of parallel screens arranged in juxtaposition, of means for feeding a thin film of material between them, and means for intermittently bringing such screen surfaces into violent contact with the material.

7. The combination with a plurality of parallel vertically disposed screens arranged in juxtaposition, of means for feeding a thin film of material between them, and means for vibrating the screens against the material.

8. The combination with a plurality of parallel vertically disposed screens arranged in juxtaposition, of means for feeding a thin film of material between them, and means for intermittently bringing such screen surfaces into violent contact with the material.

9. The combination with a cylindrical screen of means for feeding material along the surface thereof, and means for intermittently bringing such screen surface into violent contact with the material.

10. The combination with a cylindrical screen of means for feeding material along the surface thereof, and means for vibrating the screen against the material.

11. The combination with a plurality of concentric cylindrical screens arranged in juxtaposition, of means for feeding a thin film of material between them, and means for vibrating them against the material.

12. The combination with a plurality of concentric cylindrical vertically disposed screens arranged in juxtaposition, of means for feeding a thin film of material between them, and means for vibrating them against the material.

13. A pair of concentric cylindrical screens arranged one within the other, means for rapidly gyrating said screens in a horizontal plane as a unit, and means for feeding an annular stream of material downwardly between the screens.

14. A pair of concentric cylindrical screens arranged one within the other, means for rapidly gyrating said screens in a horizontal plane as a unit, and means for feeding an annular stream of material downwardly between the screens, and means for separately gathering and discharging the material which passes through the screens and the material which passes down between them.

15. A pair of concentric cylindrical screens arranged one within the other, means for rapidly gyrating said screens as a unit, and means for feeding an annular stream of material between the screens.

16. A pair of concentric cylindrical screens arranged one within the other, means for rapidly gyrating said screens as a unit, and means for feeding an annular stream of material between the screens, and means for separately gathering and discharging the material which passes through the screens and the material which passes down between them.

17. The combination with a cylindrical screen of a three point support therefor, the three points being located in a plane perpendicular to the axis of the screen, means for gyrating each of the three points to give the screen a gyratory movement in such perpendicular plane, and means for feeding material along said screen.

18. The combination with a pair of concentric cylindrical screens arranged one within the other, of a three point support therefor, and means for gyrating the three point support to give the screens a gyratory movement together with means for feeding material into the space between the screens.

19. The combination with a cylindrical vertically disposed screen of a three point support therefor, the three points being located in a plane perpendicular to the axis of the screen, means for gyrating each of the three points to give the screen a gyratory movement in such perpendicular plane, and means for feeding material along said screen.

20. The combination with a pair of concentric cylindrical vertically disposed screens arranged one within the other, of a three point support therefor, and means for gyrating the three point support to give the screens a gyratory movement, together with means for feeding material into the space between the screens.

21. A screening device, comprising two concentric cylindrical screens contained one within the other, and held together as a unit, a supporting ring for them, three eccentric bearings supporting three points on the ring, and means for rotating said bearings in unison to gyrate the screen and ring.

22. The combination with an apertured cylindrical housing of two concentric cylindrical screening members contained therein, one within the other, and rigidly held together as a unit, a supporting ring outside the housing, arms projecting inwardly therefrom through the aperture to support the screens, and means for supporting and gyrating the ring.

23. The combination with an apertured cylindrical housing of two concentric cylindrical screening members contained therein, one within the other, and rigidly held together as a unit, a supporting ring outside the housing, arms projecting inwardly therefrom through the aperture to support the screens, and three separate eccentric bearings for the ring and means for rotating them to gyrate the ring.

24. A screening device, comprising two concentric cylindrical screens one within the other, a feed plate closing the top of the inner screen, a guide ring surrounding the top of the outer screen and projecting above the plate, means for gyrating the screens, and means for feeding material on to said plate.

In testimony whereof, I affix my signature in the presence of two witnesses this 10th day of August, 1915.

EDGAR B. SYMONS.

Witnesses:
ELLA THIEME,
CHRISTINA DEANS.